United States Patent [19]

Schindler et al.

[11] Patent Number: 4,556,701
[45] Date of Patent: Dec. 3, 1985

[54] IMPREGNANT COMPOSITIONS FOR POROUS SUBSTRATES

[75] Inventors: Frederick J. Schindler, Fort Washington; Raymond L. Fulton, Jr., Feasterville, both of Pa.

[73] Assignee: Rohm and Haas Company, Philadelphia, Pa.

[21] Appl. No.: 595,068

[22] Filed: Mar. 30, 1984

[51] Int. Cl.$^4$ .................... C08F 20/40; C08F 20/10
[52] U.S. Cl. ................ 526/282; 204/159.24; 524/236; 524/310; 524/313; 526/283
[58] Field of Search ............... 526/282, 283; 524/310, 524/313

[56]  References Cited
U.S. PATENT DOCUMENTS

| 4,097,677 | 6/1978 | Emmons | 560/220 |
| 4,141,868 | 2/1979 | Emmons | 526/283 |
| 4,299,761 | 11/1981 | Emmons | 428/63 |
| 4,400,413 | 8/1983 | Emmons | 427/136 |

OTHER PUBLICATIONS

Applications of Fatty Acids in Protective Coatings, Marcel Decker, N.Y., (1968), pp. 187–208, (R. W. Fulmer).

*Primary Examiner*—Christopher A. Henderson
*Attorney, Agent, or Firm*—Alex R. Sluzas; Douglas E. Winters

[57] ABSTRACT

This invention relates to impregnant compositions for porous substrates prepared from dicyclopentenyl and dicyclopentenyloxy ($C_1$–$C_4$)alkyl acrylates and methacrylates and which include at least about 4% by weight of the impregnant composition of a component selected from the drying oil fatty acids and mixtures thereof. Cementitious surfaces impregnated with and sealed using these compositions exhibit improved water and crack resistance.

11 Claims, No Drawings

IMPREGNANT COMPOSITIONS FOR POROUS SUBSTRATES

BACKGROUND OF THE INVENTION

1. Field of the Invention

This invention relates to impregnant compositions for porous substrates prepared from dicyclopentenyl and dicyclopentenyloxy($C_1$–$C_4$)alkyl acrylates and methacrylates and which include at least about 4% by weight of the impregnant composition of a compound selected from the drying oil fatty acids and mixtures thereof.

2. Brief Description of the Prior Art

Materials which have porous surfaces, such as concrete, stone masonry and brick, are frequently employed in applications which expose those surfaces to the weather. Although these materials have very good exterior durability in comparison with many other construction materials, there are many applications in which it is desirable to protect the exposed surface with a coating or sealer composition. For example, bridge decks are often made using concrete reinforced with steel. During the winter a bridge deck may be exposed to road salt, which while necessary to avoid dangerous icing on the bridge deck, may penetrate through the concrete to the steel reinforcing bars and thereby promote the rapid deterioration of the structure. Similarly, over an extended period the surfaces of steel reinforced concrete and limestone structures such as buildings may suffer from the penetration of water from precipitation, particularly from acid rain. Porous concrete or masonry residential foundations will often permit moisture to enter residential basements, thereby reducing the variety of uses for which these areas are appropriate. Concrete floors in a wide variety of manufacturing facilities are subject to the effects of industrial chemicals. In each of the situations, and in many others, it is beneficial to impregnate the surface with a monomer composition which will cure, or polymerize, in situ to protect the substrate from fluid penetration.

Impregnant compositions for porous surfaces based on dicyclopentenyl acrylate or methacrylate or mixtures thereof are known to be polymerizable to provide hardened, hydrophobic, abrasion resistant and impact resistant surfaces on all sorts of materials, especially on floor materials or formations whether occurring naturally or artificially produced. In the description hereinafter, the abbreviation DCP(M)A is intended as a generic term to represent one or the other, or a mixture thereof, of esters of the following formula

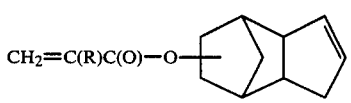

wherein R is H or $CH_3$. The (meth)acryloxy substituent may be on either the five or six position of the six member ring, and commercial products may be a mixture of the two isomers. The respective acrylate or methacrylate of the above formula may also be called: 3a,4,5,6,7-,7a-hexahydro-4,7-methanoindenyl acrylate-5-(or 6) or methacrylate-5-(or 6). U.S. Pat. No. 4,263,372 discloses the use of DCP(M)A in impregnant compositions for porous surfaces as well as in the formulation of polymer concrete which incorporates aggregate such as sand, marble chips, pebbles, crushed stone, and the like. This patent further discloses that DCP(M)A compositions are extremely hard when cured and that when it is desired to render such compositions more flexible, the DCP(M)A may be used with auxiliary acrylate and/or vinyl ester binder materials which can reduce the hardness and impart a more flexible or resilient character to the final compositions. Examples of such auxiliary binder materials include the ($C_{12}$–$C_{30}$)alkyl or ($C_{12}$–$C_{30}$)alkenyl acrylates or methacrylates, long-chain ($C_{12}$–$C_{30}$)aliphatic acid vinyl esters and the di($C_1$–$C_8$)alkyl esters of maleic acid, fumaric acid or itaconic acid. The proportion of these auxiliary monomers may be from about ½% to 60% by weight of the DCP(M)A component, but preferably not over about 40% by weight of such component.

U.S. Pat. No. 4,097,677 discloses unsaturated esters of glycol monodicyclopentenyl ethers, also known as dicyclopentenyloxy($C_2$–$C_6$)alkyl acrylates and methacrylates. These monomers may be represented by the following general formula:

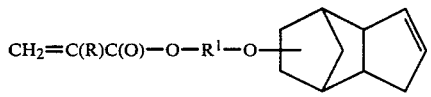

wherein R represents H or $CH_3$ and $R^1$ represents the hydrocarbon residue of a ($C_2$–$C_6$)diol. The ester-ether chain may be connected to either the 5-position or the 6-position of the ring nucleus as indicated in the general formula. In fact, a commercial product may comprise a mixture of the two compounds in which some of the molecules have their ester-ether chain substituted in the 5-position and some in the 6-position. The expression DCPOA(M)A will be used hereinafter to generically denote any of the these monomers or a mixture thereof. In comparison with DCP(M)A, which has a characteristic, pervasive, persistant and objectionable odor under certain conditions when put into use by certain operative personnel and which when used in coating, impregnating and/or molding compositions, tends to produce extremely hard and brittle products which may require plasticizers, DCPOA(M)A is less volatile, virtually free of odor, and yields polymers characterized by a lower glass transition temperature ($T_g$) than that which characterizes similar compositions prepared using DCP(M)A, greatly reducing or eliminating the need for a plasticizer in these compositions.

U.S. Pat. No. 4,299,761 discloses polymer concrete compositions prepared from dicyclopentenyloxyethyl acrylate or methacrylate, or mixtures thereof, hereinafter generically denoted by DCPOE(M)A. DCPOE(M)A polymer concrete compositions are generally hard and tough when cured. When it is desired to render these compositions more flexible, a small proportion of a drying oil or an acrylic polymer having a low glass transition temperature, or a mixture of a drying oil and a low $T_g$ acrylic polymer may be added to the composition and may replace part of the dicyclopentenyloxyethyl acrylate or methacrylate component. In the alternative, the dicyclopentenyloxyethyl acrylate or methacrylate may be used with a small proportion of an auxiliary liquid monomeric acrylic and/or vinyl ester binder forming material which is of low volatility and which can reduce the hardness and impart a more flexible or resilient character to the final composition. A mixture of the drying oil and an auxiliary monomer may also be used. Such other acrylic ester monomers include ($C_{12}$–$C_{30}$)alkyl or ($C_{12}$–$C_{30}$)alkenyl acrylates and methacrylates, ($C_{12}$–$C_{30}$)aliphatic acid vinyl esters, and the di($C_4$–$C_8$)alkyl esters of maleic acid, fumaric acid, or itaconic acid. The proportion of these auxiliary monomers may be from about $\frac{1}{2}\%$ to 25% by weight of the DCPOE(M)A component, but preferably is not over about 15% by weight of such component.

U.S. Pat. No. 4,400,413 discloses polymer concrete compositions having a non-volatile binder monomer system which contains from about 25% to 75% by weight based on total monomers of at least one dicyclopentenyloxyalkyl ester of a polymerizable alpha, beta-ethylenically unsaturated monocarboxylic acid selected from methacrylic acid or acrylic acid, including DCPOA(M)A, and from about 75% to 25% by weight based on total of monomers of at least one hydroxy ($C_1$–$C_6$)alkyl or ($C_3$–$C_6$)cycloalkyl methacrylate. These polymer concrete compositions are disclosed to exhibit improved chemical resistance in comparison with polymer concrete compositions prepared with DCPOA(M)A in the absence of the hydroxy-functional monomer. As in the case of the polymer concrete compositions prepared using dicyclopentenyloxyethyl acrylates and methacrylates, these compositions are generally hard and tough when cured. They may similarly be flexibilized by the addition of a small proportion of drying oil or acrylic polymer having a low glass transition temperature, or in the alternative, by the addition of auxiliary acrylic and/or vinyl ester binder forming monomers which have low volatility, such as the ($C_{12}$–$C_{30}$)alkyl or ($C_{12}$–$C_{30}$)alkenyl acrylates or methacrylates, ($C_{12}$–$C_{30}$)aliphatic acid vinyl esters, and the di($C_4$–$C_8$)alkyl esters of maleic acid, fumaric acid, or itaconic acid. Similarly, mixtures of the auxiliary monomer and a drying oil may be used. The proportion of auxiliary monomer, if used, may be from about $\frac{1}{2}\%$ to 25% by weight of the binder monomer system component, but preferably is not over by 20% by weight of such component.

U.S. Pat. No. 4,460,625, discloses that impregnant compositions for porous surfaces may be based upon the same monomer system.

U.S. Pat. No. 4,341,673 discloses an improved methacrylate liquid mixture for use in making methacrylate polymer concrete. "Methacrylate polymer concrete" denotes a mixture of aggregate and methacrylate monomer which is subsequently polymerized in situ, the methacrylate monomer being methyl methacrylate, ethyl methacrylate, butyl methacrylate, 2-ethylhexyl methacrylate and mixtures thereof. The improvement consists of including in the methacrylate liquid mixture:

(a) 5–12% by weight of the liquid mixture of a paraffinic oil, which contains at least 60% by weight of saturated aliphatic hydrocarbons and has a boiling point above 200° C. and (b) 4–10% by weight of the liquid mixture of an acrylic polymer wherein at least 90% by weight of the units of the acrylic polymer are derived from ($C_2$–$C_4$)alkyl methacrylate.

The methacrylate polymer is included in the mixture in the form of minute spherical beads or crushed cubes and functions by swelling when it comes into contact with the methacrylate monomer to seal off the surface of the methacrylate polymer concrete once it has been placed into a concrete repair area, thereby reducing the loss of methacrylate monomer due to its volatility.

The impregnation of concrete using methyl methacrylate has been widely studied. Development work has been carried out to demonstrate benefits from impregnation followed by cure. Heat pretreatment of the concrete is required to obtain the desired penetration by MMA, and a heat-activated cure step is usually used following penetration. This procedure is beneficial in improving concrete abrasion resistance for severe environments such as dam spillways. However, the heat pretreatment and cure may prove impractical under conditions encountered in the field.

SUMMARY OF THE INVENTION

One of the objects of this invention is to provide impregnating compositions for porous substrates which yield improved water resistance in comparison with prior art impregnating compositions based upon DCP(M)A and DCPOA(M)A. Another object of this invention is to provide impregnating compositions for porous substrates which cure more readily under ambient conditions in comparison with prior art compositions based upon DCP(M)A and DCPOA(M)A. Another object of this invention is to provide impregnating compositions for porous substrates, including cementitious substrates which are more effective in repairing cracks in such substrates than prior art compositions. Yet another object of this invention is to provide increased control over the extent of penetration of impregnating compositions into porous substrates, including cementitious substrates, in comparison with prior art compositions. A further object of this invention is to provide impregnant compositions for porous substrates, including cementitious substrates, which may be used at a lower rate of application than prior art impregnating compositions to achieve a defined level of performance, e.g., water resistance. Another object of this invention is to provide impregnant compositions for porous substrates, including cementitious substrates, which are more efficient than prior art impregnating compositions. These objects and other objects which will become apparent below are met by this invention which comprises at least one monomer selected from the group consisting of dicyclopentenyl and dicyclopentenyloxy($C_1$–$C_4$)alkyl acrylates and methacrylates and at least about 4% by weight of the composition of a component selected from the drying oil fatty acids and mixtures thereof.

DETAILED DESCRIPTION OF THE INVENTION

The compositions of this invention are comprised of at least one monomer selected from the group consisting of dicyclopentenyl and dicyclopentenyloxy($C_1$–$C_4$)alkyl acrylates and methacrylates and at least about 4% by weight of the composition of a component selected from the drying oil fatty acids and mixtures thereof.

Impregnant compositions containing drying oil fatty acid penetrate porous substrates, especially porous cementitious substrates such as portland cement concrete, more effectively than otherwise identical compositions which do not contain a drying oil fatty acid component. The more effective penetration of the uncured composition into the substrate is reflected in the superior properties of the cured composition. Porous substrates which are impregnated and cured using impregnant compositions containing drying oil fatty acid as sealer are more water and solvent resistant than otherwise identically treated substrates. The superior penetration characteristic of compositions containing at least about 4% by weight of the composition of drying oil fatty acid makes these compositions unexpectedly superior to otherwise analogous compositions which do not contain drying oil fatty acid. Although at least about 4% percent by weight of drying oil fatty acid is required to obtain the superior properties, compositions containing at least ten percent (10%) by weight of the composition are preferred and compositions containing at least twenty percent by weight of the composition are especially preferred. Compositions containing very small amounts (e.g. $\leq 2\%$ by weight) of drying oil fatty acid as, for example, counterions to transition metal ion "drier" catalyst such as $Co^{2+}$, do not exhibit the superior properties of the compositions of this invention.

The compositions of this invention may additionally comprise at least one monomer selected from the hydroxy($C_1$–$C_4$)alkyl acrylates and methacrylates wherein the proportion of dicyclopentenyl-functional monomer, that is, dicyclopentenyl or dicyclopentenyloxy($C_1$–$C_4$)alkyl acrylate or methacrylate, to hydroxy-functional momomer, that is, hydroxy($C_1$–$C_4$)alkyl acrylate or methacrylate, is from about 1:3 to 3:1. Examples of the hydroxy-functional monomers which may be used in the compositions of this include hydroxypropyl methacrylate, hydroxyethyl methacrylate, hydroxymethyl acrylate, hydroxybutyl acrylate, and hydroxyethyl acrylate. Hydroxyethyl methacrylate and hydroxypropyl methacrylate are preferred. Hydroxypropyl methacrylate is especially preferred.

The compositions of this invention may additionally comprise a polymerization catalyst. The polymerization catalyst may initiate and/or catalyze the polymerization of the monomers employed in the compositions of this invention. Multiple catalysts may be employed simultaneously in the compositions of this invention. When multiple catalytic species are present in the compositions of this invention, they may be referred to as a catalyst system.

It is well known in the art that when acrylate or methacrylate monomers are polymerized by a free radical mechanism in the presence of oxygen, as is usually encountered outside the controlled atmosphere of the laboratory or manufacturing plant, oxygen dissolved or present at or near the surface of the liquid monomer inhibits the cure thereof. Unless the unreacted, unpolymerized monomer present at or near the surface of the polymer mass resulting from the polymerization reaction is volatile under ambient conditions, as in the case of methyl methacrylate, the incomplete cure resulting from oxygen inhibition may result in a surface which is tacky or slippery to the touch. In many applications such a surface is undesirable. One way this situation can be improved or corrected is by including in the monomer mixture a catalyst which promotes the oxidative cure or reaction of monomers which bear ethylenically unsaturated functionality. Such catalysts have long been known in the coatings art under the rubric "driers" and are known to be useful in promoting the oxidative cure of unsaturated oils such as linseed oil and compounds and polymers derived therefrom.

The compositions of this invention may additionally comprise a catalyst system, including a free radical initiator or catalyst useful for the bulk cure of the monomer system and an additional catalyst useful in promoting the cure of the surface of the composition. The surface cure catalyst may comprise a drier, a photoactive catalyst, or a mixture thereof.

Specifically, a composition of this invention may additionally comprise a polymerization catalyst consisting of
 (a) an organic peroxide and an aromatic amine accelerator, or
 (b) a polyvalent metal salt or complex and organic hydroperoxide, or
 (c) mixtures of (a) and 0.005% to 2% by weight based on the total weight of monomers of a polyvalent metal salt or complex, or
 (d) mixtures of (a) and (b), or
 (e) a polyvalent metal salt or complex.
Polymerization catalyst (e) is preferred.

The polyvalent metal salt or complex used in the invention may be any polvalent metal-containing salt that catalyzes the oxidative curing of drying oils and, when added to oil-based varnishes and paints, hastens the drying or curing thereof. These metal salts or complexes are also known, in the art, as "siccatives" or "driers". Such substances include the polyvalent metal salts of higher aliphatic acids, such as the butyrate, pentanoate, hexanoate, and especially the salts of higher aliphatic acids having from 8 to 30 carbon atoms or of naphthenic acids that provide solubility in the binder monomer system. Generally, the most useful drier salts for the binder monomer system compositions of the present invention are salts of naphthenic acids or of ($C_8$–$C_{30}$)aliphatic acids. Examples of the polyvalent metal include calcium, copper$^{II}$, zinc$^{II}$, manganese$^{II}$, manganese$^{III}$, lead$^{II}$, cobalt$^{II}$, iron$^{III}$, vanadium$^{II}$, and zirconium$^{IV}$. These salts or complexes accelerate the action of the organic hydroperoxide and promote oxidative curing in the organic peroxide-amine catalyst system. Other examples of the acid component or anion of the drier salt are those of resinic acids, (that is, rosin acids), tall oil fatty acids, linseed oil fatty acids, 2-ethylhexanoic acid, lauric acid, palmitic acid, myristic acid, stearic acid, oleic acid, linoleic acid, linolenic acid, behenic acid, cerotic acid, montanic acid, and abietic acid. A mixture of drier salts may be used.

Preferred drier salts are those of cobalt and manganese, such as cobalt octoate, cobalt naphthenate, cobalt acetylacetonate, manganese octoate, manganese naphthenate, manganese acetylacetonate, vanadium acetylacetonate and cobalt neodeconoate.

Aromatic amines may be used in small amounts with the organic peroxides and generally accelerate the action of the peroxide. For example, aniline, N,N-dimethylaniline, N,N-diethylaniline, toluidine, N,N-dimethyl p-toluidine, N,N-di(hydroxyethyl)toluidine, and p-dimethylaminobenzaldehyde may be added for this purpose in an amount of 0.1 to 2 percent by weight of the binder monomer system.

The organic peroxides and hydroperoxides that may be used include the peroxides and the hydroperoxides derived from hydrocarbons which contain from about 3 to 18 carbon atoms so that they are soluble in the impregnant monomer system. Suitable organic hydroperoxides include tertiary-butylhydroperoxide, cumene hydroperoxide (CHP), methyl ethyl ketone hydroperoxide and diisopropylbenzene hydroperoxide. Suitable peroxides include benzoyl peroxide, tertiary-butylperbenzonate, 2,2-bis-(tert-butylperoxy)-butane, bis-(1-hydroxy-cyclohexyl)-butane, bis-(1-hydroxy-cyclohexyl)peroxide, and tert-butylperoxy-isopropyl carbonate.

A more preferable polymerization catalyst is a mixture of an organic peroxide and an aromatic amine. An especially preferable polymerization catalyst is a mixture of benzoyl peroxide and N,N-dimethyl p-toluidine.

The addition of a polyvalent metal salt or complex, preferably with an organic hydroperoxide, in small amounts, can be made to the impregnant monomer system prior to use. The proportion of metal salt or complex added to the composition before use may be from 0.0005 weight percent up to about 2 weight percent, and the amount of hydroperoxide may be in the range of 0.1 to 3 weight percent, based on the total weight of the monomers.

Similarly, the addition of an organic peroxide, with an aromatic amine accelerator, and optionally with a polyvalent metal salt or complex, can be made to the impregnant monomer mixture prior to use. The proportion of the organic peroxide to the composition may be in the range of 0.1 to 3 weight percent and the aromatic accelerator is used in an effective amount, usually in the range of about 0.1 to 5 weight percent.

The polyvalent metal salt or complex and hydroperoxide, or the aromatic amine accelerator and peroxide, may be kept in separate packages and shipped separately to the site of operations where the respective components may be combined and where the composition of the present invention is to be used, as by pouring to impregnate a concrete floor or base or pavement. Alternatively, the aromatic amine accelerator and binder monomer system, may be combined in a package for storing and shipping prior to combining them with the organic peroxide to provide the composition of the invention shortly before using the composition.

The composition may be colored by a suitable amount of pigment or dye dissolved in the binder monomer system. The amount of such pigment or dye may vary from about 1% to 10% by weight of the composition.

The use of both organic peroxide and aromatic amine accelerator or organic hydroperoxide and polyvalent metal salt drier serves to ensure the curing of the composition to a solid state in a relatively short time, such as from 5 to 30 minutes. However, curing of the surface may require additional drying time such as up to 24 hours or so to overcome tackiness because of the inhibition of polymerization of the binder monomers by free radical action occurring at the air/surface interface. This initial tackiness may be overcome more rapidly by coating of the exposed surface(s) shortly after initial hardening of the composition with a free radical initiator contained in a suitable immisicible liquid that will exclude air from the surface after application thereto.

The use of fatty acids in protective coatings is well known in the coatings art, see, for example, R. W. Fulmer, "Applications of Fatty Acids and Protective Coatings," *Fatty Acids and Their Industrial Applications* (Marcel Decker, N.Y., 1968) 187-208. As used herein, the term "drying oil fatty acid" denotes both drying fatty acids and semi-drying fatty acids. Preferably, a composition according to this invention may comprise a drying oil fatty acid selected from isomerized linseed oil fatty acid, linseed oil fatty acid, soya oil fatty acid, tung oil fatty acid, safflower oil fatty acid, oiticia oil fatty acid, sunflower seed oil fatty acid, castor oil fatty acid, tall oil fatty acid, and mixtures thereof. Drying oil fatty acids derived from natural products such as linseed oil may contain both unsaturated and saturated fatty acids. Synthetic drying oil fatty acids may also be employed.

Refined isomerized drying oil fatty acids, such as Pamolyn ®300 or Pamolyn ®200, products of Hercules, Inc., may also be employed. Drying oil fatty acids containing conjugated loci of unsaturation such as 2,4-hexadienoic acid, 9,11-octadecadienoic acid, 9,11,13-octadecatrienoic acid, and 10,12,14-octadecatrienoic acid, are preferred.

The compositions of this invention may additionally comprise a minor amount of at least one drying oil. Examples of drying oils which may be employed in the compositions of this invention include tung oil, linseed oil, soybean oil, isomerized linseed oil, safflower oil, sunflower seed oil, castor oil, and tall oil.

The compositions of this invention may in addition comprise a solvent for the monomer mixture. The solvent may be used in an amount effective to reduce the viscosity of the monomer mixture in order to increase the rate and depth of penetration of the composition into the substrate. Solvents which are both volatile and polar are preferred. The addition of a solvent or solvent mixture to the monomer mixture may also be useful when it is necessary to achieve a viscosity within a specific range for other purposes. For example, when the mode of application of the composition is by spray, a low viscosity is often desirable in order to speed the application process and make efficient use of the application equipment employed. Examples of solvents which may be used are alcholic solvents such as methanol, ethanol, butanol, and xylene, mineral spirits, and methyl amyl ketone.

The compositions of this invention may additionally comprise a stabilizer or monomer inhibitor such as a ketoxime stabilizer or hydroquinone as an inhibitor. In addition, other well known adjuvants can be included in the compositions of the invention including, for example, anti-oxidants and antiozidants and flow control agents.

In the absence of a drying oil fatty acid such as linseed oil fatty acid, the compositions described hereinabove are generally hard and brittle when cured. When it is desired to render such compositions still more flexible, a small proportion of a drying oil, such as linseed oil, as described above, or of an acrylic polymer having a low glass transition temperature ($T_g$), such as poly(ethylacrylate), poly(butylacrylate), or poly(2-ethylhexylacrylate), or a mixture of a drying oil and low $T_g$ acrylic polymer, may be added to the composition and may replace part of the impregnant monomer system. Alternatively, the required impregnant monomers may be used with a small proportion of an auxiliary liquid monomeric acrylic and/or vinyl ester binder-forming material which is of low volatility and can reduce the hardness and impart a more flexible or resilient character to the final composition. A mixture of a drying oil and an auxiliary monomer may also be used. Such other acrylic ester monomers include ($C_{10}$–$C_{30}$)alkyl, or ($C_{12}$–$C_{30}$)alkenyl, acrylates or methacrylates such as lauryl acrylate, myristyl acrylate, palmityl acrylate, oleyl acrylate, linoleyl acrylate, linolenyl acrylate, stearyl acrylate. Isodecyl methacrylate is preferred. Similar improvements in flexibility may be obtained by including with the required impregnant monomers long chain ($C_{12}$–$C_{30}$)aliphatic acid vinyl esters, e.g., vinyl laurate, vinyl oleate, vinyl stearate or di($C_4$–$C_8$)alkyl esters of maleic acid, fumaric acid, or itaconic acid, e.g., the dibutyl, dihexyl, or dioctyl fumarate, maleate, or itaconate; as well as di(meth)acrylates of polyethers such as polyethylene glycol, polypropylene glycol, or polytetramethylene glycol. The required impregnant monomers may also be used with small proportions of multifunctional, i.e., polyethylenically unsaturated, monomers such as polyol(meth)acrylates and polyalkylene polyol(meth)acrylates, such as ethylene glycol diacrylate or dimethacrylate, trimethylolpropane triacrylate or trimethacrylate, triethylene glycol di(meth)acrylate, etc. All of these monomeric materials have low volatility and are polymerizable by the action of the peroxide and the metal salt drier to form products having greater toughness and resistance to water, organic solvents, acids, and alkali. The proportion of these auxiliary monomers, if used, may be from about ½ percent to used, may be from about ½ percent to 25% by weight of the monomer system component, but preferably is not over about 20% by weight of such component.

Portland cement concrete is a commercially important substrate which may be impregnated by the compositions of the present invention. The chemical composition and physical structure of portland cement concrete are complex, and vary significantly with the initial composition and cure conditions. An important physical property of portland cement concrete is its porosity. This property is related to the distribution and nature of capillaries within the cured portland cement concrete which is in turn highly correlated with the water/cement ratio and cure time used in preparing the concrete. At a sufficiently low water/cement ratio continuous capillaries will not form on cure and porosity will take the form of non-continuous gel pores. The compositions of this invention may be used efficaciously in the impregnation of portland cement concrete with at least some continuous capillary structure. The water resistance of portland cement concrete depends on the nature and extent of the capillary network. For a concise review of the composition and structure of portland cement concrete, see B. Zolin, "Factors Affecting the Durability of Concrete," 64(4) TAPPI (April, 1981) 121.

One way of minimizing the water used in preparing portland cement concrete while retaining adequate fluidity is to use dispersants referred to as "water reducing agents" or "superplasticizers." Minimization of water not only improves the strength of the concrete, it improves durability against the following degradation mechanisms:

(1) freeze-thaw,
(2) acid attack,
(3) sulfate attack (aluminum sulfates generate forces due to increase in volume), and
(4) corrosion of steel reinforcing bars induced by penetration of corrosive materials, especially chloride salts.

One method of improving the resistance of concrete to penetration of water is the use of "damp-proofing" additives which make the capillary structure hydrophobic. Stearic acid is an effective low cost damp-proofing agent. Damp-proofing agents are believed not to be needed for concrete placed with low water/cement ratios to minimize capillary volume.

The invention contemplates the impregnation of already formed articles having a porous surface with the compositions of this invention penetrating at least the outer pores of the surface of such porous articles to make the surface resistant to penetration by such liquids as water, organic solvents, acids, alkalies, and other corrosive liquids. Examples of porous-surfaced materials include portland cement concrete, stone masonry or brick walls, including the facings of the mortar between the bricks and stones, weathered archeological artifacts and wall structures, weathered granite and marble walks and sculptures previously formed and hardened, floors, walls, and ceilings, whether formed of plaster, concrete, cement, wood, pressed boards, pressed metals such as those formed of iron, aluminum, and steel binders, and the like. Impregnation of the surfaces of such articles with the compositions of this invention results in the impartation of a hardened, relatively impermeable surface adapted to resist cracking as well as penetration by means of moisture and other liquids such as those mentioned above. Such impregnation results in rendering the objects resistant to the corrosive and degradative effects caused by weathering and subjection to atmospheric smog resulting from discharges into the air of industrial and internal combustion waste gases, e.g., oxides of sulfur, nitrogen, and carbon, from autos, et al.

The compositions of this invention may be applied to the porous substrate to be coated, impregnated or sealed, by a variety of methods. For example, the composition may simply be poured on the substrate and spread, using, for example, a rubber squeegee, a string mop, a sponge mop or the like. After allowing a sufficient time for penetration to occur, usually a few minutes, excess material may be removed if desired. Alternatively, the composition may be sprayed onto the substrate using airless spray, or spray equipment employing air, nitrogen or some other type of propellant: Several coats of composition may be applied. To some extent, the appropriate method of application and amount of material to be applied is determined by the nature and porosity of the substrate, and can and will be determined by those skilled in the sealer/coating application art.

Whether the compositions of this invention will function when cured as a coating, sealer or impregnant is determined in part by the porosity and nature of the substrate. In the case where the substrate to be treated does not contain a true pore structure, for example, portland cement concrete prepared using a water/cement ratio of less than about 0.4, the cured composition functions as a coating on the surface of the substrate, and is effective in reducing certain types of environment damage (e.g., solvent attack).

Depending on the size of pores existing at the surface of the various articles to be impregnated, the liquid impregnating composition may include pigments, fillers, and other materials including small-sized aggregates.

The aggregate that is mixed with the monomer system can be any material whether capable of curing or not. Examples of inert materials are very small pebbles, sand, or other so-called aggregate materials used in making of concrete. The sand that may be used may be of any quality or of any size which is smaller than the pores to be filled. Sand of small particle size such as "Ottawa" sand and "Best" sand or a mixture of the two may be used to better advantage. Ottawa sand is a silica sand of the type referred to as "round." Best sand is of the type known as "sharp". In both cases, fines can be used. In general, however, the sieve size of the sand may vary over a fairly wide range. In lieu of or in addition to sand, it is possible to use ground glass, emery powder, ground slag, very fine gravel, trap rock and similar aggregates.

It is often advantageous to incorporate in the mixture, with or without sand, a minor fraction of clay and/or of a hydraulic cement; if so, the clay may take the form of kaolin, china clay, porcelain clay, fire clay, pipe clay, Bentonite, and, in fact, almost any of the known types of clay. Of course, other materials of small nature may be employed including broken clay products, marble chips, crushed stone, and other typical aggregate materials used in the making of terrazzo floors or walls provided they are small in size in comparison with the pores to be filled. The hydraulic cement that may be employed includes portland cements of the various types, the white cements, the natural cements, pozzolanic cements, cements derived from industrial slags and "fly ash", aluminous cements, and, in general, all of the commercially available hydraulic cements. Also included are hydraulic limes and similar materials of kinds well known to those skilled in the art.

The selection of the particle size of the aggregate depends on the pore size and distribution present in the porous material to be impregnated.

The compositions of this invention may additionally comprise a minor amount of photoactive compound selected from benzophenone, and benzophenone derivatives of the formula $C_6H_5C(O)C_6H_4R$; where R is selected from 4—$CH_3$, —OH, —$NH_2$, —Cl, —$CO_2H$, —$CO_2CH_3$; 2—$CO_2H$, —$CO_2CH_3$, —$NH_2OH$; and 3-$NO_2$, —$CO_2H$ and —$CO_2CH_3$. The photoactive compound is useful in promoting the cure of the surface of the compositions of the present invention. The improved surface cure may be reflected in improved water resistance, especially when the composition contains a drying oil component.

It is understood that commercial grade hydroxyethyl methacrylate and hydroxypropyl methacrylate monomers are used and that, as is known in the art, such commercial grade monomers generally contain about 90% and 92%, respectively, of the desired ester product, the balance to 100% being high boiling methacrylate compounds, methacrylic acid, dimethacrylate compounds and the corresponding alkylene oxide.

In the following examples illustrating but a few embodiments of the invention, the parts and percentages are by weight and the temperatures are in Celsius or Centigrade degree unless otherwise stated.

The following abbreviations are used to designate the corresponding compounds:

| | |
|---|---|
| DCPOEMA = | dicyclopentenyloxyethyl methacrylate |
| CHP = | cumene hydroperoxide |
| HEMA = | hydroxyethyl methacrylate |
| HPMA = | hydroxypropyl methacrylate |
| LOFA = | linseed oil fatty acid |

The following tests are employed to evaluate the physical properties of the cured substrates produced from the compositions of the invention:

Procedure A—Concrete Water Resistance

Mortar blocks are prepared by casting in aluminum weighing dishes using a mortar mix of 3/1 sand/portland cement, 0.6 water/portland cement. The blocks are cured at about 100% relative humidity for one day, then brushed vigorously under deionized water and cured further under deionized water for 10 days. The blocks are stored under ambient laboratory conditions until use (about 1 year). The blocks are 17 mm thick, with the immersion face having a circular-shaped area of 5.7 centimeters in diameter.

Impregnant mixtures are prepared from DCPOEMA, LOFA, and cobalt neodecanoate in solvent (6% Co, Cobalt Ten-Cem from Mooney Chemicals). All mixtures contain 0.126% cobalt based on monomer weight. The impregnant mixtures are applied to pre-weighed blocks. The face to be immersed in water is treated with 0.80 grams of impregnant. Additional impregnant is applied to the sides, giving a total of 1.09–1.21 grams of impregnant applied per block. The treated blocks are held at ambient laboratory conditions for 6 days, then re-weighed and placed with the treated face under water on a layer of glass beads in paint cans. The cans are covered with aluminum foil. At intervals, the blocks are withdrawn from the water, excess water is removed with a tissue, and the block re-weighed. The resistance of the blocks to increase in weight gives a measure of the effectiveness of the impregnant as a sealer.

Procedure B—Water, Solution and Solvent Uptake of Mortar Blocks

A set of mortar samples of water/cement ratios of 0.4 and 0.6 is prepared, using ¼ pint paint cans as molds. The mortar blocks are hydrocured for 142 days, then sawed in half and allowed to ambient dry for over 125 days. These blocks thus represent well-cured examples of mortar having these water/cement ratios. The blocks have some macro-voids due to difficulty in filling the paint cans, especially at the 0.4 water/cement ratio.

Groups of these blocks are treated with one of the following solutions:

(1) 80/20 DCPOEMA/LOFA with cobalt,
(2) 80/20 DCPOEMA/LOFA without cobalt,
(3) 40/40/20 DCPOEMA/HPMA/LOFA with cobalt.

The treatment solutions are applied by partial immersion (to a fixed depth, ¼ inch) of the blocks in the treatment solution for ½ hour ("uptake procedure"). The add-on achieved varies greatly with water/cement ratio.

Procedure C—Restoration of Cracked Concrete

Concrete bars 12"×2"×1" (31.5 cm×5.1 cm×2.5 cm) are cast in wooden forms from a concrete mix containing 66 parts by weight of #45 mesh sand, 22 parts by weight of Type 1 portland cement, and 12 parts by weight of water (water/cement ratio is 0.55) Polytetrafluoroethylene-coated metal shims 1¼" (3.2 cm) wide and either 0.01" (0.25 mm), 0.02" (0.5 mm), 0.04" (1 mm) or 0.98" (2.49 cm) thick are inserted to a depth of 0.5" (1.27 cm) into the uncured concrete. Two shims of the same thickeness are inserted for each bar, at a distance of 2" (5.08 cm) from each end of the bar. The shims are both inserted into the same 12"×2" face of bar. The bars are then cured for 7 to 10 days at 100% relative humidity, dried to constant weight at 120° C., and subsequently conditioned under ambient laboratory conditions for several days prior to use. The shims are removed to yield "cracks" in the test bars.

Cracks are filled using a sealer having the composition: 100 parts by weight of monomer mixture, 2 parts by weight of cobalt drier containing six percent by weight of cobalt, and 4 parts by weight of 73% active cumene hydroperoxide. The sealer is continuously added to a molded-in crack until the crack appears to remain full; that is, until seepage into the concrete has ceased. One crack per bar is filled. The bars having filled cracks are then conditioned in the laboratory for 3 to 5 days under ambient conditions before flexural strength testing.

The flexural strength of the bars is tested using a three-point test, with the cracks on the surface in tension, a span between the two support edges on the top of the bar of 2" (5.08 cm), with the crack centered between the support edges and on the same surface (top) of the bar, the third support edge is centered underneath the crack on the bottom of the bar. A loading rate of 600 psi/min. is used.

after 21 days than LOFA (Examples 4–6). Non-drying oil acids, such as oleic acid and isostearic (Examples 7 and 8) are significantly less effective than LOFA. A substantial amount of drying oil itself (Example 9, linseed oil) may be included in the impregnant composition without significantly reducing water resistance. Minor amounts of antioxidant and other common coatings additives (Examples 10–12) may be added. The oxidative cure catalyst level may be increased (Example 13) but some water resistance is lost.

TABLE I

Water Uptake of Impregnated Mortar Disks[1]

| Example No. | Impregnant Composition DCPOEMA (wt. %) | Other (weight %) | Water Uptake (% by weight of treated mortar) | | | | | |
|---|---|---|---|---|---|---|---|---|
| | | | 1 day | 2 days | 3 days | 7 days | 15 days | 21 days |
| 1 | 80 | 20 LOFA | 0.16 | 0.26 | 0.41 | 0.73 | 1.08 | 1.30 |
| 2 | 60 | 40 LOFA | 0.22 | 0.30 | 0.42 | 0.73 | 1.08 | 1.38 |
| 3 | 60 | 20 LOFA, 20 DCO[2] | 0.26 | 0.36 | 0.47 | 0.70 | 0.95 | 1.20 |
| 4 | 80 | 20 Pamolyn ® 200[3] | 0.19 | 0.30 | 0.43 | 0.73 | 1.08 | 1.26 |
| 5 | 90 | 10 Pamolyn ® 300[3] | 0.37 | 0.93 | 4.60 | 6.16 | | |
| 6 | 80 | 20 Pamolyn ® 300 | 0.17 | 0.23 | 0.30 | 0.57 | 0.78 | 1.06 |
| 7 | 80 | 20 oleic acid | 0.36 | 0.66 | 1.44 | 5.32 | | |
| 8 | 80 | 20 isostearic acid | 0.33 | 0.44 | 0.57 | 1.07 | 3.02 | 4.94 |
| 9 | 40 | 20 LOFA, 40 linseed oil | 0.24 | 0.36 | 0.50 | 0.99 | 1.46 | 1.80 |
| 10 | 40 | Same as 9 + 0.1% Antioxidant 330[3] | 0.26 | 0.39 | 0.62 | 1.04 | 1.79 | 2.11 |
| 11 | 40 | Same as 9 + 0.32% Exkin #2[5] | 0.27 | 0.40 | 0.62 | 1.19 | 1.90 | 2.31 |
| 12 | 40 | Same as 9 + 0.77% 1,10-phenanthroline | 0.68 | 0.98 | 1.43 | 3.35 | 4.06 | 4.24 |
| 13 | 40 | Same as 9, double Co level | 0.33 | 0.54 | 0.72 | 1.54 | 1.96 | 2.06 |
| Comp. Ex. No. | | | | | | | | |
| 1 | 100 | none | 5.62 | 5.84 | | | | |
| 2 | 50 | 50 HPMA + 2% CHP | 5.87 | 6.01 | | | | |
| 3 | 90 | 10 Prosil 178[6] | 2.49 | 4.97 | | | | |
| 4 | 90 | 10 Prosil 178 + 2% CHP | 3.73 | 5.73 | | | | |
| 5 | 90 | 10 Prosil 248[7] | 5.62 | 5.78 | | | | |
| 6 | 90 | 10 Prosil 248 + 2% CHP | 5.63 | 5.81 | | | | |

[1]0.8 g of impregnant composition applied to face of mortar disk (88 g, 57 mm diameter, 17 mm thick).
[2]Dehydrated castor oil.
[3]Pamolyn = Trademark of Hercules, Inc. for refined isomerized drying oil fatty acids -- Pamolyn 300 = highest conjugation.
[4]1,3,5-trimethyl-2,4,6-tris/3,5-di-tert-butyl-4-hydroxybenzyl/benzene.
[5]Methylethyl ketoxime; Exkin is a trademark of Tenneco Chemicals.
[6]Trademark of PCR, Inc. for isobutyl trimethoxysilane. PCR, Inc. is an division of SCM Corp.
[7]Trademark of PCR, Inc. for methacryloxypropyl trimethoxysilane The data presented in Table I reveal that the water resistance of impregnant compositions based on DCPOEMA is significantly improved by the addition of drying oil fatty acids such as LOFA to the composition. Mortar disks are prepared, impregnated and evaluated for water uptake according to Procedure A. Even after twenty one days of immersion in water, disks impregnated using a DCPOEMA/LOFA blend (Examples 1 and 2) exhibit a low level of water uptake in comparison with an untreated disk (Comparative Example 1), disks impregnated with a DCPOEMA/HPMA blend containing CHP (Comparative Example 2), or disks treated with silane water-proofing agents (Comparative Examples 3–6). Conjugated drying oil fatty acids, such as Pamolyn ®200 and 300, are somewhat more effective The data in Table II illustrate that LOFA is not effective in reducing the water resistance of impregnated mortar discs prepared according to Procedure A when used at a level of less than from about 4% by weight. When used at a level of two percent of the weight of the impregnant composition (Example 14), no improvement over impregnant based on DCPOEMA above (Comparative Example 7) is observed. However, substantial improvement is observed in the early results (one and two days of immersion) for a composition containing only four percent by weight of LOFA (Example 15). Increasing the level of LOFA above eight percent (Examples 16–19) improves the persistence of the water resistance conferred by the presence of the LOFA as judged by the fourteen day results.

TABLE II

Water Uptake of Impregnated Mortar Disks: Effect of DCPOEMA/LOFA Ratio

| Example No. | Weight % LOFA/DCPOEMA | Water Uptake (% by weight of treated mortar) | | | | | | |
|---|---|---|---|---|---|---|---|---|
| | | 1 day | 2 days | 3 days | 4 days | 7 days | 11 days | 14 days |
| 14 | 2 | 5.12 | 5.31 | 5.40 | 5.49 | 5.56 | 5.67 | 5.73 |
| 15 | 4 | 1.88 | 3.22 | 4.67 | 5.33 | 5.69 | 5.88 | 5.97 |
| 16 | 8 | 0.23 | 0.34 | 0.48 | 0.62 | 1.68 | 3.24 | 4.13 |

TABLE II-continued

Water Uptake of Impregnated Mortar Disks:
Effect of DCPOEMA/LOFA Ratio

| Example No. | Weight % LOFA/DCPOEMA | Water Uptake (% by weight of treated mortar) | | | | | | |
|---|---|---|---|---|---|---|---|---|
| | | 1 day | 2 days | 3 days | 4 days | 7 days | 11 days | 14 days |
| 17 | 12 | 0.22 | 0.36 | 0.45 | 0.56 | 0.83 | 1.57 | 2.20 |
| 18 | 16 | 0.22 | 0.32 | 0.42 | 0.53 | 0.73 | 1.05 | 1.26 |
| 19 | 20 | 0.23 | 0.36 | 0.50 | 0.62 | 0.84 | 1.30 | 1.86 |
| Comparative Example No. 7 | 0 | 4.93 | 5.13 | 5.20 | 5.24 | 5.35 | 5.39 | 5.44 |

Table III gives data which illustrate the effects on water resistance of (1) using the composition of this invention as an impregnant/sealer for porous portland cement concrete in comparison with its use on relatively non-porous concrete, and (2) curing the compositions for different periods of time prior to evaluating water resistance. Comparison of Examples 20–22, in which porous motor disks are treated (water/cement ratio=0.6), with Examples 23–25, in which low porosity disks are treated (water/cement ratio=0.4), reveals that substantially less impregnant penetrates or is absorbed in the latter case than in the former, as determined by sample weight. In addition, the water resistance of the former is substantially greater than the latter. Finally, when these data are compared with the corresponding water resistance data for untreated disks (Comparative Examples 8 and 9), it is seen that the relative water resistance improvement effected by use of the impregnant composition is greater for the more porous disks (0.6 water/cement ratio).

Comparison of Example 21 with Example 20 shows that inclusion of an oxidative cure catalyst is necessary to maximize the level of water resistance achieved. However, even when the catalyst is omitted (Example 21) water resistance of porous disks is improved in comparison with untreated porous disks (Comparative Example 8). The level of water resistance achieved depends to some extent on the amount of impregnant used and/or the length of cure (Examples 26–31 compared with Examples 20–25)

TABLE III

Water Uptake of Impregnated Mortar Blocks

| | Water Sample[1] Composition | | | | Water/ Cement Ratio for Mortar | Sample[2] Weight (g) | Approx. Coverage (calc'd) (Ft.[2]/gal.) | Air-Cure Period Prior to Water Uptake (Days) | Water Uptake | |
|---|---|---|---|---|---|---|---|---|---|---|
| | A | B | C | D | | | | | Exposure Period (Days) | % Water Uptake |
| Example No. | | | | | | | | | | |
| 20 | + | + | − | + | 0.60 | 6.28 | 52 | 4 | 27 | 0.57 |
| 21 | + | + | − | − | " | 6.22 | 67 | " | " | 1.67 |
| 22 | − | + | + | + | " | 6.65 | 48 | " | " | 1.13 |
| 23 | + | + | − | + | 0.40 | 0.68 | 381 | " | " | 2.18 |
| 24 | + | + | − | − | " | 0.66 | 361 | " | " | 5.18 |
| 25 | − | + | + | + | " | 0.66 | 378 | " | " | 3.76 |
| 26 | + | + | − | + | 0.60 | 3.71 | | 12 | 20 | 0.63 |
| 27 | + | + | − | − | " | 3.12 | | " | " | 4.49 |
| 28 | − | + | + | + | " | 1.05 | | " | " | 1.69 |
| 29 | + | + | − | + | 0.40 | 0.82 | | " | " | 2.10 |
| 30 | + | + | − | − | " | 0.60 | | " | " | 5.53 |
| 31 | − | + | + | + | " | 0.37 | | " | " | 3.54 |
| Comp. Ex. No. | | | | | | Control, 0.00 | | | | |
| 8 | − | − | − | − | 0.60 | " | | — | 31 | 5.90 |
| 9 | − | − | − | − | 0.40 | " | | — | 31 | 4.07 |

[1]The presence of component A, B, C or D is denoted by "+", its absence by "−".
A = DCPOEMA (80%)
B = LOFA (20%)
C = DCPOEMA/HPMA//1/1 (80%)
D = 0.129% Cobalt
[2]Sample applied to mortar block by ½ hour dipping (uptake procedure).

The data in Table IV detail the improved resistance to solvents exhibited by portland cement concrete impregnated with compositions of this invention. Hydraulic fluid, xylene and gasoline are chosen as solvents representative of industrial environments. Comparison of treated blocks with untreated blocks exposed to solvent shows that treatment protects against solvent penetration of the blocks.

TABLE IV

Solvent and Water Uptake of Impregnated Mortar Blocks

| Ex. or Comp. Ex. No.[1] | Sample[2] Composition | | | | Sample[3] Weight (g) | Test Liquid | % Absorbed by Mortar in 16 hrs. Contact | % Remainder in Mortar after 24 hrs. Air Dry | % Water Uptake |
|---|---|---|---|---|---|---|---|---|---|
| | A | B | C | D | | | | | |
| 32 | + | + | − | + | 4.56 | Skydrol | 0.13 | 0.09 | 0.99 |

TABLE IV-continued

Solvent and Water Uptake of Impregnated Mortar Blocks

| Ex. or Comp. Ex. No.[1] | Sample[2] Composition A | B | C | D | Sample[3] Weight (g) | Test Liquid | % Absorbed by Mortar in 16 hrs. Contact | % Remainder in Mortar after 24 hrs. Air Dry | % Water Uptake |
|---|---|---|---|---|---|---|---|---|---|
| 33 | + | + | − | − | 4.53 | 500 B hydraulic fluid | 0.13 | 0.09 | 3.18 |
| 34 | − | + | + | + | 4.72 | hydraulic fluid | 0.13 | 0.09 | 0.92 |
| 10* | − | − | − | − | 0 | hydraulic fluid | 4.13 | 4.00 | 1.67 |
| 35 | + | + | − | + | 6.12 | Xylene | 0.45 | −0.11 | 0.92 |
| 36 | + | + | − | − | 5.86 | " | 0.70 | −0.07 | 3.50 |
| 37 | − | + | + | + | 6.87 | " | 0.50 | 0.12 | 1.21 |
| 11* | − | − | − | − | 0 | " | 4.32 | 0.06 | 5.99 |
| 38 | + | + | − | + | 7.42 | Gasoline Amoco | 0.25 | 0.01 | 0.57 |
| 39 | + | + | − | − | 6.73 | leaded | 1.61 | 0.13 | 2.60 |
| 40 | − | + | + | + | 6.86 | regular | 0.90 | 0.38 | 0.68 |
| 12* | − | − | − | − | 0 | (high sulfur) | 2.77 | 0.10 | 4.74 |

[1]Comparative Examples are denoted by an asterisk.
[2]Sample composition as in Table III.
[3]Sample applied as in Table III. Mortar's water/cement ratio = 0.6. Samples are air-cured 10 days prior to exposure to test liquid. Samples are exposed to water for 20 days prior to measuring water uptake.

The data in Table V detail the resistance of impregnated mortar blocks to aqueous salt solutions (sodium sulfate and sodium chloride) and aqueous detergent solutions. The data again shows the improvement in resistance effected by oxidatively curing the impregnant composition (e.g., Example 42 in comparison with Examples 41 and 43).

TABLE V

Solution Uptake of Impregnated Mortar Blocks

| Example No. | Sample[2] Composition A | B | C | D | Sample Weight[3] (g) | Aqueous Test Solution | Test Solution % Uptake |
|---|---|---|---|---|---|---|---|
| 41 | + | + | − | + | 3.70 | sodium sulfate, 0.7M | 0.63 |
| 42 | + | + | − | − | 3.11 | sodium sulfate, 0.7M | 3.75 |
| 43 | − | + | + | + | 3.90 | sodium sulfate, 0.7M | 0.87 |
| 44 | + | + | − | + | 9.78 | sodium chloride, 0.7M | 0.50 |
| 45 | + | + | − | − | 5.37 | sodium chloride, 0.7M | 3.63 |
| 46 | − | + | + | + | 8.29 | sodium chloride, 0.7M | 0.54 |
| 47 | + | + | − | + | 6.27 | Triton ®[4] X-100, 0.01% | 0.65 |
| 48 | + | + | − | − | 3.15 | Triton ®[4] X-100, 0.01% | 5.08 |
| 49 | − | + | + | + | 4.90 | Triton ® X-100, 0.01% | 1.08 |
| 50 | + | + | − | + | 7.11 | Triton ® X-100, 1.0% | 0.54 |
| 51 | + | + | − | − | 5.18 | Triton ® X-100, 1.0% | 4.14 |
| 52 | − | + | + | + | 3.95 | Triton ® X-100, 1.0% | 0.90 |

[2]Sample composition as in Table III.
[3]Sample applied as in Table III. Mortar is water/cement ratio = 0.6. Samples are air-cured 12 days prior to exposure to test liquid. Samples are exposed to water for 20 days prior to measuring water uptake.
[4]Triton is a trademark of Rohm and Haas Company. Triton ® X-100 surfactant is an alkyl phenol ethoxylate. -CAS Registry No. 9036-19-5.

The data in Table VI illustrate the effect of abrading impregnated mortar blocks on the water resistance of these blocks. For porous blocks (0.6 water/cement ratio), abrasion has little effect on water resistance (cf., e.g., Example 53 with 56 or 55 with 58). On the other hand, abrasion of non-porous blocks (0.4 water/cement ratio) which have been treated significantly reduce their water resistance (cf., e.g., Example 59 with Example 60 or 61 with 63). This result suggest that non-porous blocks are coated rather than impregnated with the composition.

TABLE VI

Abrasion of Impregnated Mortar Blocks

| Ex. or Comp. Example No.[1] | Sample[2] Composition A | B | C | D | Water/Cement Ratio for Mortar | Sample[3] Weight (g) | Abrasion Data[4] g/cm² Weight Applied to Mortar | Weight Loss (g) | % Water Uptake |
|---|---|---|---|---|---|---|---|---|---|
| 53 | + | + | − | + | 0.60 | 5.09 | 59.7 | 0.1058 | 0.62 |
| 54 | + | + | − | − | " | 6.54 | " | 0.1238 | 2.37 |
| 55 | − | + | + | + | " | 3.04 | " | 0.1043 | 1.55 |
| 13* | − | − | − | − | " | 0 | | 0.1461 | 7.51 |
| 56 | + | + | − | + | " | 3.71 | Not Abraded | 0 | 0.63 |
| 57 | + | + | + | − | " | 3.12 | " | 0 | 4.49 |
| 58 | − | + | + | + | " | 1.05 | " | 0 | 1.69 |

TABLE VI-continued

Abrasion of Impregnated Mortar Blocks

| Ex. or Comp. Example No.[1] | Sample[2] Composition A | B | C | D | Water/ Cement Ratio for Mortar | Sample[3] Weight (g) | Abrasion Data[4] g/cm² Weight Applied to Mortar | Weight Loss (g) | % Water Uptake |
|---|---|---|---|---|---|---|---|---|---|
| 59 | + | + | − | − | 0.40 | 0.68 | 59.7 | 0.2778 | 5.39 |
| 60 | − | + | + | + | " | 0.43 | " | 0.1242 | 4.80 |
| 14* | − | − | − | − | " | 0 | " | 0.1737 | 5.95 |
| 61 | + | + | − | + | " | 0.82 | Not Abraded | 0 | 2.10 |
| 62 | + | + | − | − | " | 0.60 | " | " | 5.53 |
| 63 | − | + | + | + | " | 0.37 | " | " | 3.54 |

[1] Comparative Examples are denoted by an asterisk.
[2] Sample composition as in Table III
[3] Sample applied as in Table III. Samples are air-cured 12 days prior to exposure to water. Samples are exposed to water for 20 days prior to measuring water uptake.
[4] 48, 8½-inch strokes of mortar disk on 180°C grit (silicon carbide) paper.

The data presented in Table VII indicate the effects of filling cracks introduced in concrete bars according to Procedure C with both DCPOEMA/HPMA-based sealer and a sealer composition based on DCPOEMA/HPMA/LOFA. The results presented in Table VII indicate that both sealer compositions are effective in restoring a large proportion of the flexural strength of concrete lost because of cracks. The LOFA-modified sealer appears to be even more effective than the unmodified sealer at large crack widths.

TABLE VII

Flexural Strength Restoration in Cracked Concrete

| Sample | Flexural Strength (psi) Crack width | | | | |
|---|---|---|---|---|---|
|  | 0.01" | 0.02" | 0.04" | 0.98" | Average |
| Uncracked | — | — | — | — | 849 ± 166[1] |
| Unsealed crack | — | — | — | — | 366 ± 52[2] |
| Crack sealed using monomer mix of DCPOEMA/HPMA// 0.5/0.5 | 742 | 607 | 690[3], 720 | 502[3], 585 | 645 |
| Crack sealed using monomer mix of DCPOEMA/ HPMA/LOFA// 0.45/0.45/0.10 | 667 | 877 | 772 | 765 | 769 |

[1] Average of 28 hours tested, standard deviation given.
[2] Average over all crack widths (4 crack widths), 28 bars tested.
[3] Duplicate determinations.

I claim:

1. A nonaqueous composition for impregnating cementious substrates comprising at least one monomer selected from the group consisting of dicyclopentenyl- and dicyclopentenyloxy($C_1$–$C_4$)alkyl acrylates and methacrylates and at least about four percent by weight of the composition of a component selected from the drying oil fatty acids and mixtures thereof.

2. A composition according to claim 1 additionally comprising at least one monomer selected from the hydroxy($C_1$–$C_4$)alkyl acrylates and methacrylates wherein the proportion of dicyclopentenyl-functional monomer to hydroxy-functional monomer is from about 1:3 to 3:1.

3. A composition according to claim 1 additionally comprising a polymerization catalyst consisting of
   (a) an organic peroxide and an aromatic amine accelerator, or
   (b) a polyvalent metal salt or complex and an organic hydroperoxide, or
   (c) mixtures of (a) and 0.005% to 2% by weight based on the total weight of monomers of a polyvalent metal salt or complex, or
   (d) mixtures of (a) and (b), or
   (e) a polyvalent metal salt or complex.

4. A composition according to claim 3 additionally comprising a minor amount of at least one drying oil.

5. A composition according to claim 3 wherein the drying oil fatty acid is conjugated.

6. A composition according to claim 5 wherein the drying oil fatty acid is selected from isomerized linseed oil fatty acid, linseed oil fatty acid, tung oil fatty acid, soya oil fatty acid, safflower oil fatty acid, sunflower seed oil fatty acid, castor oil fatty acid, tall oil fatty acid, oticia oil fatty acid, and mixtures thereof.

7. A composition according to claim 2 wherein the dicyclopentenyl-functional monomer is dicyclopentenyl-oxyethyl methacrylate and the hydroxy-functional monomer is hydroxypropyl methacrylate.

8. A composition according to claim 3 additionally comprising a minor amount of a ketoxime stabilizer.

9. A composition according to claim 3 additionally comprising a minor amount of a photoactive compound selected from benzophenone, and benzophenone derivatives of the formula $C_6H_5C(O)C_6H_4R$; where R is selected from 4—$CH_3$, —OH, —$NH_2$, —Cl, —$CO_2H$, —$CO_2CH_3$; 2—$CO_2H$, —$CO_2CH_3$, —$NH_2OH$; and 3—$NO_2$, —$CO_2H$ and —$CO_2CH_3$.

10. A composition according to claim 3 additionally comprising at least one solvent selected from methanol, ethanol, butanol, xylene, mineral spirits and methyl amyl ketone.

11. A composition according to claim 3 additionally comprising isodecyl methacrylate.

* * * * *